United States Patent [19]

Gilson et al.

[11] 4,344,577

[45] Aug. 17, 1982

[54] CONSTRUCTION OF NOZZLE

[76] Inventors: James J. Gilson, Dublin Rd., Skerries, County Dublin; Richard B. Barrett, Inishduff, Dargle Rd., Bray, County Wickow, both of Ireland

[21] Appl. No.: 163,636

[22] Filed: Jun. 27, 1980

[30] Foreign Application Priority Data

Jun. 29, 1979 [IE] Ireland .................................. 465/79
Sep. 26, 1979 [IE] Ireland ................................ 1831/79

[51] Int. Cl.³ ............................................ B05B 15/00
[52] U.S. Cl. ..................................... 239/546; 239/329
[58] Field of Search .............................. 239/546, 329; 73/425.4 P, 425.6; 128/234, 238

[56] References Cited

U.S. PATENT DOCUMENTS 3,014,666 12/1961 Verbouwens ........................ 239/329
4,093,108 6/1978 Hein et al. ...................... 73/425.4 P Primary Examiner—James B. Marbert
Attorney, Agent, or Firm—Sughrue, Mion, Zinn, Macpeak and Seas

[57] ABSTRACT

A nozzle for providing a high discharge velocity of a fluid fed to the nozzle comprises a pipe having an orifice at one end, at least the portion of the pipe adjacent the said one end being internally tapered towards the orifice. An insert member having an externally tapered portion substantially conforming to the internal taper of the end portion of the pipe is located in the said end portion. At least one of the tapered portions of the pipe or insert member has a groove establishing a fluid connection between the interior and exterior of the pipe. The nozzle may form part of a fluid injection device having a manually operable plunger slidably mounted in the pipe for ejection of fluid from the nozzle.

7 Claims, 3 Drawing Figures

CONSTRUCTION OF NOZZLE

This invention relates to a construction of nozzle and in particular to a construction of nozzle which incorporates therein an insert member which is for assembly preferably self locating into an operative position, the nozzle incorporating the said insert member being adapted to facilitate a relatively high fluid discharge velocity through said nozzle of a fluid fed to said nozzle.

The present invention provides a nozzle for providing a high discharge velocity of a fluid fed to the nozzle, the nozzle comprising a pipe having an orifice at one end with at least the portion of the pipe adjacent the said one end being internally tapered towards the orifice, and an insert member having an externally tapered portion substantially conforming to the internal taper of the end portion of the pipe and located in the said end portion, the internally tapered end portion of the pipe and/or the externally tapered portion of the insert member having one or more surface grooves establishing a fluid connection between the interior of the pipe and the outside thereof.

Preferably the nozzle components are all made from a plastics material i.e. polycarbonate polypropylene or polyvinyltetrachloride and each component is designed for production using an injection moulding process. The insert member is preferably formed as a central cylindrical portion having at each end thereof a truncated cone portion the angle of taper of the cone being complementary to the angle of taper of the end portion of the pipe of the nozzle, each tapered portion of the insert member being provided along portion of its longitudinal length with one or more grooves to provide a fluid connection between the interior of the nozzle and the outside thereof. Further it is preferable that the overall longitudinal length of the insert member be greater than the internal diameter of the pipe into which said insert member is introduced to form the nozzle. It is also preferable that in order to achieve a locking taper between the internally tapered end portion of the pipe and the externally tapered portion of the insert member that the taper angle be less than 5°.

The present invention will be understood from an embodiment thereof given by way of example only with reference to the accompanying drawings in which.

Figure 1:
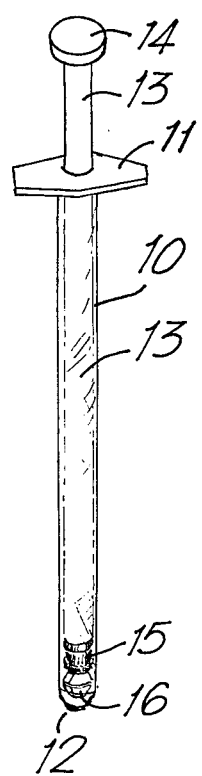
FIG. 1 is a perspective view of a fluid injection device having a nozzle according to an embodiment of the invention.
Figure 2:
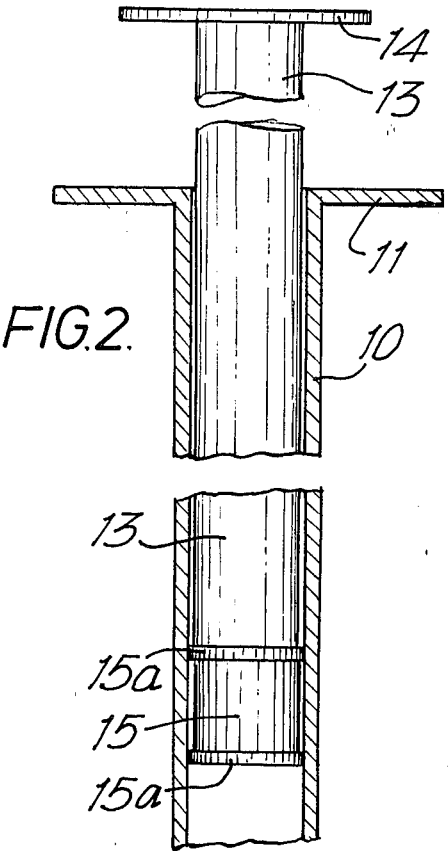
FIG. 2 is a longitudinal sectional view of the said device to an enlarged scale.
Figure 3:
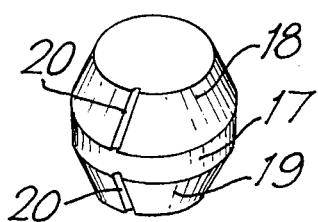
FIG. 3 is a perspective view of the insert member of the nozzle of the fluid injection device.

The embodiment of the present invention illustrated in the accompanying drawings is a fluid injection device which has a particular application and prior to furnishing a detailed description of the injection device it is appropriate to give a brief outline of the use to which the device will be put.

All beers, including stouts, ales and lagers, hereinafter referred to collectively as beer, contain an amount of dissolved carbon dioxide gas which comes out of solution to form a head for the beer when the beer is poured. In order to achieve a smooth full head with a draught beer an inert gas such as nitrogen may be added and the dispensing of the draught beer under pressure through a dispense tap is usually sufficient to bring both the carbon dioxide and the inert gas out of solution to give a smooth full head.

It is now desired to market draught beer in bottles, the beer containing carbon dioxide and say nitrogen. A problem associated with bottled draught beer is how to achieve sufficient turbulence within the draught beer, when the beer is poured from the bottle, to give the beer a good smooth full head. It has been found that to inject a jet of air into the poured draught beer will create turbulence in the beer sufficient to bring the gases out of solution and give the poured draught beer a good smooth full head. The embodiment of the present invention, which will now be described, is a fluid injection device suitable for injecting air or any other suitable gas into poured draught beer to cause the desired turbulence in the said beer.

Referring to the drawings the fluid injection device comprises an injection moulded polycarbonate pipe 10 of circular cross-section having a flange 11 at one open end and having an internally (and externally) tapered end portion 12 adjacent the other open end which constitutes the discharge orifice of the device. The pipe 10 slidably accommodates a moulded polycarbonate plunger 13 having at one end a top plate 14 and at the other end a rubber grommet 15 which engages along seals 15a the interior wall of the pipe 10 in a fluid tight manner. Apart from the end portion 12, the pipe 10 is of constant internal diameter.

The pipe 10 also houses a moulded polycarbonate insert member 16 which is located in and cooperates with the tapered end portion 12 of the pipe 10 to form a nozzle for the injection device. The insert member 16 has a central cylindrical portion 17 with oppositely directed truncated cone portions 18, 19 at each end thereof respectively. Each of the two truncated cone portions 18, 19 has therein a surface groove 20 for establishing a fluid connection between the interior of the pipe 10 and the outside thereof. In operation, it is only one of the grooves 20 which provides the fluid connection between the interior 21 of the pipe and the outside of the nozzle, in the present case the groove 20 in the cone portion 19. The insert member 16 is provided with two grooved cone portions 18, 19 solely to facilitate assembly of the nozzle, in that either end of the insert member 16 can be inserted into the pipe 10 to provide an operative device. Thus when assembled as shown, the groove 20 of the cone portion 18 is in operation redundant - as stated earlier the provision of two cone portions 18, 19 is for ease of assembly. It is to be understood that the angle of taper of each cone portion substantially corresponds to the internal taper of the end portion 12 of the pipe 10, so that the fluid connection is only by way of a groove 20.

The longitudinal length x of the insert member is greater than the diameter y of the pipe 10 which demands that the insert member 16 must on assembly of the device be introduced into the upper open end of the pipe 10 with a truncated cone portion 18 or 19 leading, such that the leading cone portion 18 or 19 will engage the internally tapered surface of the end portion 12 of the pipe 10 to form a nozzle. The angle of taper of both the internal surface of the end portion 12 and the external surface of the cone portion 18, 19 should not exceed about 5° in order to allow the complementary engaging tapered surfaces to achieve a self-locking engagement. With a pipe 10 having an internal diameter of 4.75 mm the longitudinal length of the insert member is 5 mm.

The cylindrical portion 17 has a depth of 1 mm and the grooves 20 a depth of 0.25 mm.

It should be noted that the end face of the operative cone portion does not fill the orifice of the pipe, instead when the insert member 16 is in a locking position in the end portion 12 of the pipe 10 the end face is slightly recessed from the orifice.

In operation, in order to impart a smooth full head to a glass of draught beer poured from a bottle, the plunger 13 is manually withdrawn until the rubber grommet 15 is near the flange end of the pipe 10 such action serving to draw in conventional manner air into the interior of the pipe 10. The pipe 10 of the plunger device is then inserted into the poured beer and the plunger 13 manually pressed down into the pipe 10 to inject the air through the operative groove 20 of the insert member 16 and the orifice of the pipe 10 as a high velocity jet of air into the beer.

The device may, however, be used in a modified manner to that described above. The modified manner of use, which is basically use of the device as a syringe will now be described.

In this instance in order to impart a smooth full head to a glass of draught beer poured from a bottle, the nozzle end of the injection device is inserted into the poured beer and the plunger is withdrawn until the rubber grommet is near the flange end of the pipe, such action serving to draw poured beer into the interior of the pipe. The plunger is then pressed down into the pipe to eject the beer in the pipe, through the operative groove of the insert member and the orifice of the pipe, as a high velocity liquid jet, into the poured draught beer.

The turbulence caused in the poured draught beer by such ejection of the beer from the syringe is sufficient to cause the gases in the poured draught beer to come out of solution and cause the formation of the required head on the beer.

The term "beer" used in this specification is used collectively to embrace stouts, ales and lagers.

It will be readily appreciated that the construction of nozzle of the present invention has many applications and the present invention is not confined in its application to the specific embodiment described above. The construction of nozzle according to the present invention has the facility to be used in such instances where it is required to discharge at a high velocity a fluid fed under pressure to the nozzle.

It will also be understood that the components of the nozzle may all be injection moulded from a wide range of plastics material, provided such plastics materials are consistent with the use for which the nozzle is intended. The component parts of the nozzle may of course as required be made from metal, glass or the like conventional materials. It is also to be understood that more than one groove 20 may if desired be provided in each cone portion 18 and 19. Furthermore, one or more grooves may additionally or alternatively be provided in the internal tapered surface of the end portion 12 of the pipe 10.

We claim:

1. A nozzle device for providing a high discharge velocity of a fluid fed to the nozzle, comprising: a pipe having an orifice at one end, at least the portion of the pipe adjacent said one end being internally tapered towards the orifice, and an unattached and freely displaceable insert member having an externally tapered portion defining one of a truncated cone and a conical surface adapted to mate with a correspondingly configured internally tapered surface of the nozzle orifice, at least one of the internally tapered end portion of the pipe and the externally tapered portion of the insert member having at least one surface groove establishing fluid communication between the interior of the pipe and the exterior thereof, wherein the pipe is of circular cross-section and the insert member comprises a pair of cone portions extending in opposite directions longitudinally of the pipe, the angle of taper of each cone portion being complementary to the angle of taper of the end portion of the pipe, and the insert member being located in the pipe with one of the cone portions engaging the internally tapered end portion.

2. A fluid injection device comprising a pipe having an orifice at one end, at least the portion of the pipe adjacent said one end being internally tapered towards the orifice, an unattached and freely displaceable insert member having an externally tapered portion defining one of a truncated cone and a conical surface adapted to mate with a correspondingly configured internally tapered surface of the pipe orifice, at least one of the internally tapered end portion of the pipe and the externally tapered portion of the insert member having at least one surface groove establishing fluid communication between the interior of the pipe and the exterior thereof, and a manually operable plunger slidably mounted in the pipe for ejecting fluid in the pipe through a nozzle formed by the internally tapered end portion of the pipe and the insert member, wherein the pipe is of circular cross-section and the insert member comprises a pair of cone portions extending in opposite directions longitudinally of the pipe, the angle of taper of each cone portion being complementary to the angle of taper of the end portion of the pipe, and the insert member being located in the pipe with one of the cone portions engaging the internally tapered end portion.

3. A device as claimed in claim 1 or 2, wherein the cone portions are truncated and extend from opposite sides of a central cylindrical portion of the insert member.

4. A device as claimed in claim 3, in which each cone portion of the insert member is provided with at least one groove extending between the central cylindrical portion and the truncated end of the respective cone portion.

5. A device as claimed in claim 3, in which the pipe has an opening at the opposite end thereof to the internally tapered end through which opening the insert member is introduced into the pipe to form the nozzle, and in which the overall dimension of the insert member from the truncated end of one cone portion to the truncated end of the other cone portion is greater than the internal diameter of the pipe at the said opening.

6. A device as claimed in claims 1 or 2, in which angle of taper of the insert member and the end portion of the pipe is less than about 5°.

7. A device as claimed in claim 1, in which the pipe and insert member are injection moulded components of plastics material.

* * * * *